(12) United States Patent
Bernhards et al.

(10) Patent No.: US 6,224,429 B1
(45) Date of Patent: May 1, 2001

(54) TERMINAL BLOCK ASSEMBLY INCLUDING RAIL FASTENING MEANS

(76) Inventors: Peter Bernhards, Waldheidestrasse 48a, 32758 Detmold; Wolfgang Schild, Wagnerstrasse 12, 32049 Herford; Rudolf Steinmeier, Hohler Weg 45; Manfred Wilmes, Ellernbruchweg 19, both of 32760 Detmold, all of (DE)

( * ) Notice: Subject to any disclaimer, the term of this patent is extended or adjusted under 35 U.S.C. 154(b) by 0 days.

(21) Appl. No.: 09/290,255

(22) Filed: Apr. 13, 1999

(30) Foreign Application Priority Data

Apr. 15, 1998 (DE) .......................................... 298 06 691 U

(51) Int. Cl.[7] ....................................................... H01R 9/22
(52) U.S. Cl. ................................................................ 439/709
(58) Field of Search ...................................... 439/709, 532, 439/922, 710, 711, 712, 715, 716, 717, 718, 719, 723, 724, 725, 726, 727, 728, 729

(56) References Cited

U.S. PATENT DOCUMENTS 4,878,859 * 11/1989 Haller .................................... 439/716
5,411,417   5/1995  Horn et al. ............................ 439/709
5,588,881  12/1996  Eggest et al. ........................ 439/709

FOREIGN PATENT DOCUMENTS 29720511  2/1998  (DE) .
  326 624  4/1992  (EP) .

* cited by examiner

Primary Examiner—Lincoln Donovan
Assistant Examiner—Javaid Nasri
(74) Attorney, Agent, or Firm—Laubscher & Laubscher

(57) ABSTRACT

A synthetic plastic terminal block assembly includes a housing containing a longitudinal through passage in which is mounted a unitary fastening member having a center portion that is connected with the housing, and a pair of end portions resiliently connected for independent displacement relative to the center portion and to the housing, the end portions having opposed inwardly-directed hook-shaped foot portions adapted to extend under the outwardly extending flanges at the upper ends of the legs of a U-shaped mounting rail, thereby to fasten the terminal block to the rail. With this extremely simple design, the terminal block can be mounted downwardly upon the rail from above. The terminal block can be easily disconnected from the rail at either side, and if necessary, the terminal block can be pivoted laterally away from the rail.

7 Claims, 3 Drawing Sheets

TERMINAL BLOCK ASSEMBLY INCLUDING RAIL FASTENING MEANS

BACKGROUND OF THE INVENTION

1. Field of the Invention

This invention relates to an electrical terminal block assembly including a unitary fastening member having a pair of hook-shaped locking feet that are connected for independent movement relative to the terminal block housing, thereby to simplify the mounting and dismounting of the terminal block relative to a support rail.

2. Brief Description of the Prior Art

The mounting of electrical and electronic terminal blocks on support rails having a generally U-shaped cross-sectional configuration is well known in the patented prior art, as disclosed, for example, in the assignee's prior U.S. Pat. Nos. 5,411,417 and 5,588,881.

As evidenced by the European patent No. 0326 624 B1, it is well known in the prior art to provide electrical terminal blocks that are mounted transversely upon support rails by means of a resilient fastening element that is so rotationally positioned on a pivot pin that sliding motion of a first slide fastener member is transmitted in the opposite direction to a second slide fastener member. In both slide members, external chambers are provided having bottom portions from which injection-molded resilient bridges laterally protrude, while in the adjacent region of the surrounding housing, there is provided in each case a recess having an outwardly-extending boundary wall which forms a thrust bearing for the elastic deformation of the resilient bridge. When the terminal block housing is mounted transversely across the flanges at the upper ends of the legs of the support rail, the oblique catch hooks are initially pressed outwardly and then in a snapping manner grasp the flanges of the support rail. The terminal block housing is removed from the support rail by opening the resiliently-biased slide pieces to disengage the same from the flanges of the support rail, whereupon the terminal block is lifted vertically off the support rail.

The German Gebrauchsmuster No. DE G 297 20 511 discloses the use of a terminal block assembly similar to that of the European patent No. EP 0326 624 B1 for the flush-fitting of housings for printed circuit boards and electronic modules. While the terminal block assembly operates generally satisfactorily, it is always subject to the constant demand for cheaper cost and simpler operation.

The present invention was developed to provide an improved terminal block assembly having a design which results in reduced production costs while at the same time provides improved fastening means for connecting and disconnecting the terminal block housing from the support rail.

SUMMARY OF THE INVENTION

Accordingly, a primary object of the present invention is to provide an improved terminal block assembly including a housing, and a unitary fastening member having a pair of hook-shaped locking feet connected for independent movement relative to the housing, thereby to simplify the mounting and dismounting of the terminal block relative to a support rail.

According to a more specific object of the invention, the terminal block assembly includes a housing containing a longitudinal through passage in which is mounted a unitary fastening member having a center portion that is connected with the housing, and a pair of end portions resiliently connected for independent displacement relative to the center portion and to the housing, the end portions having opposed inwardly-directed hook-shaped locking foot portions adapted to extend under the outwardly extending flanges at the upper ends of the legs of a U-shaped mounting rail, thereby to fasten the terminal block to the rail.

According to another object of the invention, the terminal block assembly includes a synthetic plastic housing containing a horizontal longitudinally-extending through passage, and a unitary fastening member mounted within said through passage, said fastening member including a center portion connected with the housing, a pair of end portions mounted for independent sliding movement in opposite ends of the through passage, respectively, and a pair of resilient portions integrally connecting said end portions with said center portion, said end portions carrying hook-shaped locking feet having inwardly directed catch projections, said end portions being resiliently biased inwardly together toward normally engaged positions in which the catch feet extend in locking engagement beneath the outwardly extending flanges on the support rails. Upon displacement of either end portion toward a disengaged position relative to the support rail, the terminal block housing may be pivoted about the support rail toward a disconnected position in which the terminal block may be lifted laterally from the support rail.

The present invention offers the advantages that a single integral resilient synthetic plastic fastening member is used in combination with the synthetic plastic terminal block housing, thereby dispensing with the prior injection-molded spring elements that were used to bias the locking feet toward the mounting rail. The present invention thus provides a single simple, inexpensively molded fastening component, which is cheaper to produce that the known support rail fastening devices of the prior art.

In accordance with a preferred embodiment of the invention, each of the integrally-molded resilient intermediate portions of the fastening member has a serpentine configuration and functions as a tension spring for biasing the associated end portion inwardly toward the center portion. Such resilient portions offer the possibility of integral design of the fastening member with the associated slidably mounted end portions, thereby to produce a structure that is is relatively uncomplicated in terms of product engineering.

According to another object of the invention, in order to prevent undesired separation of the terminal block from the support rail, the through passage has a greater vertical cross-sectional dimension than the corresponding dimension of the end portions of the fastening member, and the adjacent bottom walls of the fastening member end portions and the associated bottom wall surfaces of the through passage have cooperating stop means arranged to lock the end portions in their engaged positions in which the locking feet are engaged with the flange portions of the support rail. Thus, upon the application of a slight lifting force to the terminal block relative to the support rail, the cooperating stop surfaces may be brought into engagement to lock the end portions in their rail-engaged positions relative to the terminal block housing.

According to a further object of the invention, the upper surfaces of the opposed catch portions of the locking feet projections are inwardly and downwardly inclined, and the bottom surfaces of the catch portions are downwardly and outwardly inclined. This design of the catch hooks makes for simple and secure guidance of the locking feet during the assembly of the terminal block housing upon the mounting rail. Furthermore, the remote surfaces of the locking feet and the associated adjacent wall surfaces of the terminal block housing are inclined and arranged to limit the outward extent of displacement of the fastener end portions relative to the center portion. There is no need for the shaping of any separate stop pieces, thereby affording a further cost reduction during the production and assembly of the terminal block assembly.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
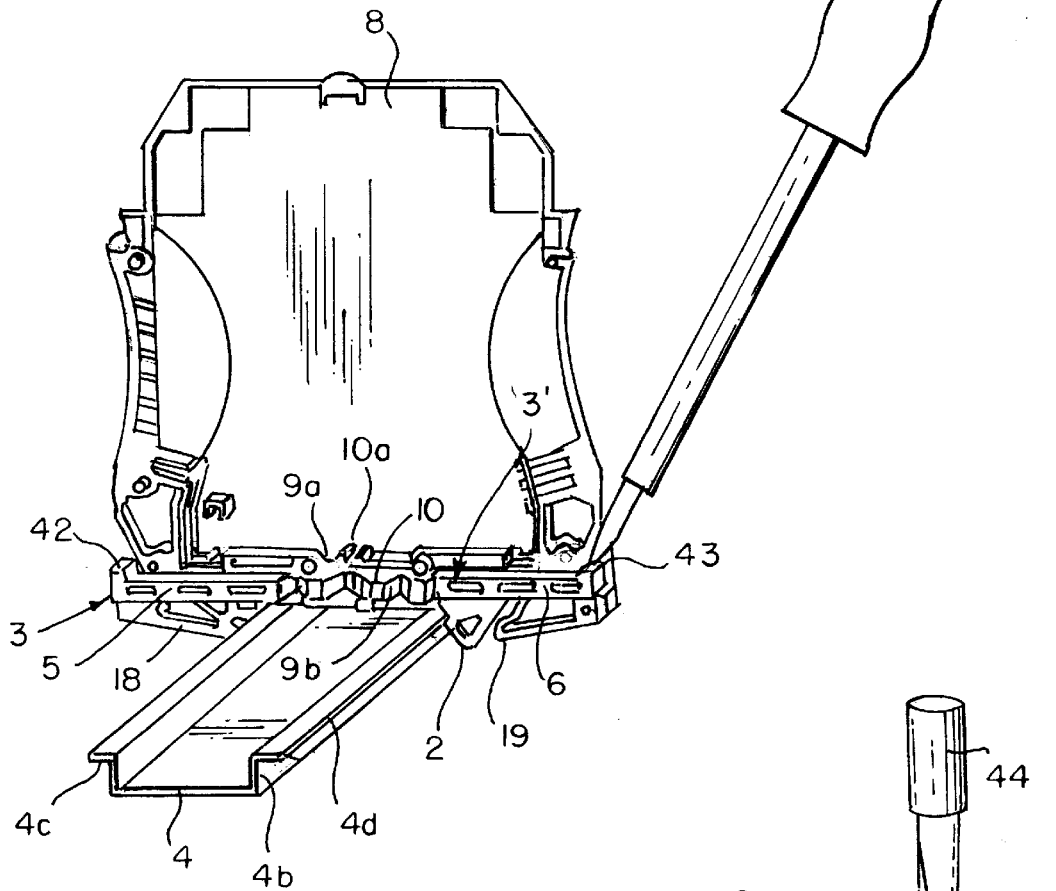
FIG. 1 is a front perspective view of the terminal block assembly of the present invention mounted on a support rail.
Figure 2:
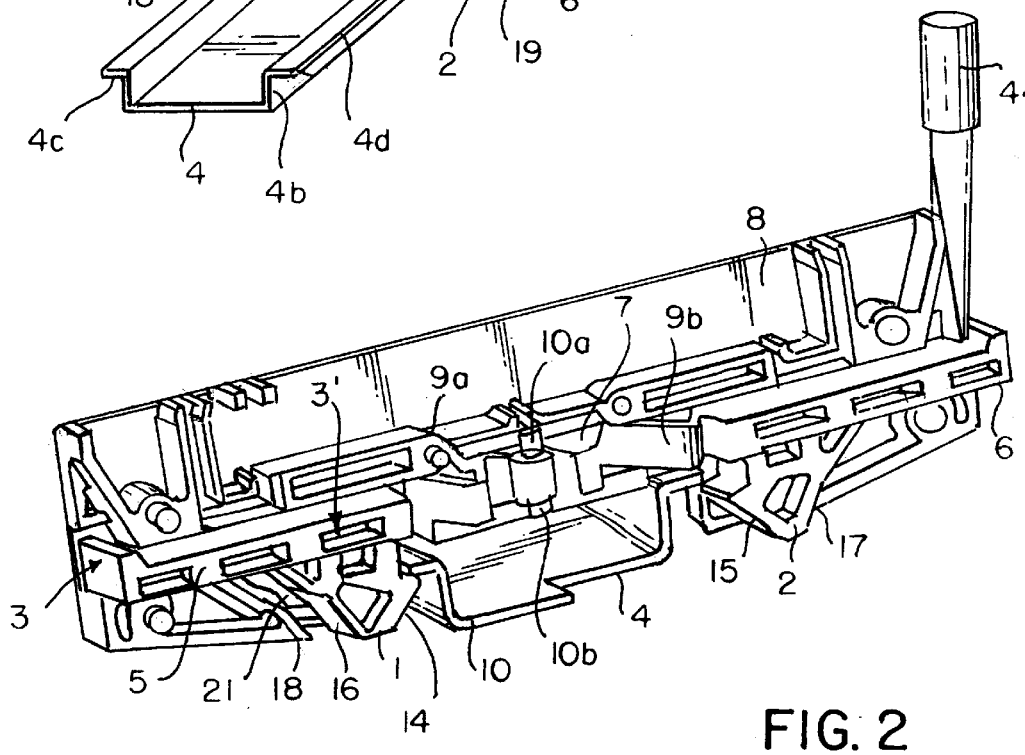
FIG. 2 is a detailed perspective view of the lower portion of the terminal block housing of FIG. 1, with the right hand locking foot displaced to its disengaged position relative to the terminal block housing and the support rail.
Figure 3:
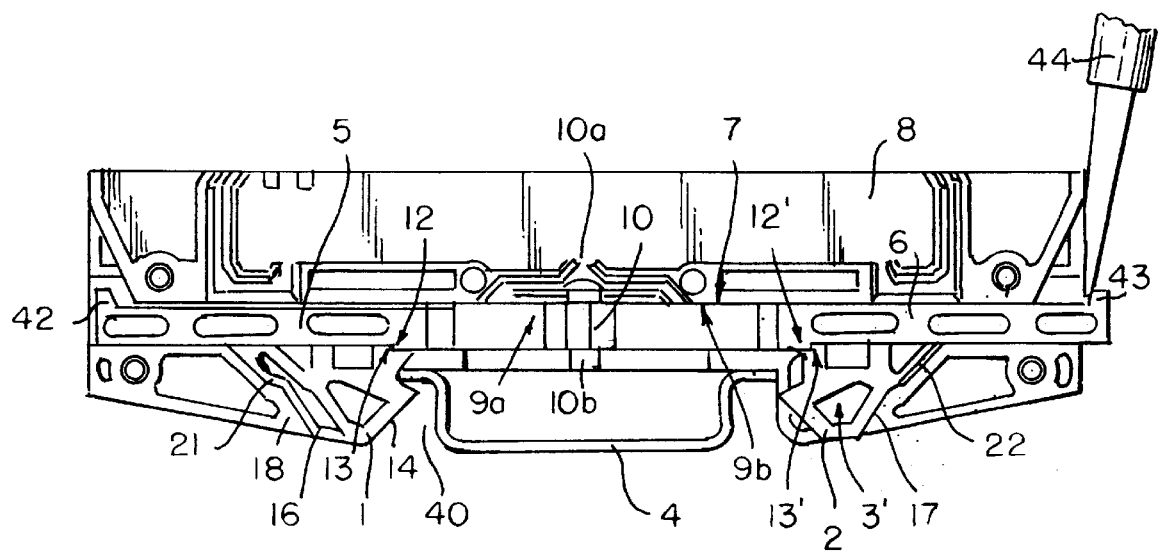
FIG. 3 is a detailed front elevational view of the terminal block assembly of FIG. 2.
Figure 4:
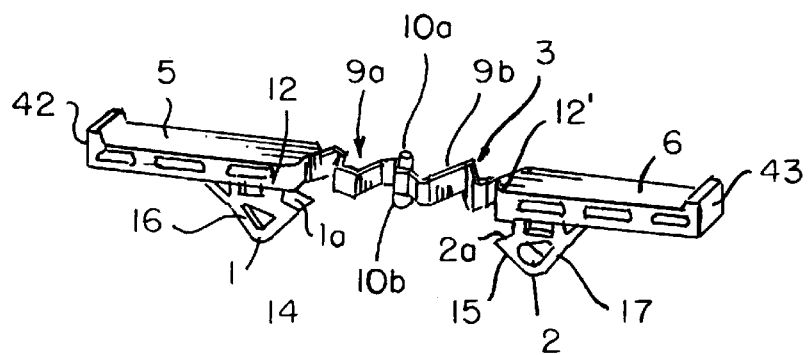
FIG. 4 is a front perspective view of the fastener element of FIGS. 1–3.

Referring first more particularly to FIG. 1, the electrical or electronic terminal block assembly of the present invention includes a housing 8 that is formed of a suitable electrically insulating synthetic plastic material, said housing having a generally rectangular configuration and including top, bottom, and a pair of end portions. The bottom portion contains a groove 40 (FIG. 3) that receives the conventional support rail 4 when the housing 8 is mounted transversely thereupon, as shown in FIG. 1. As is known in the art, the support rail 4 has a generally U-shaped cross-sectional configuration and includes a pair of upwardly extending leg portions 4a and 4b that terminate at their upper ends in outwardly extending flange portions 4c and 4d. The bottom portion of the housing 8 contains a transverse through passage or channel 7 that receives the unitary fastener member 3. As best shown in FIG. 4, the fastener member 3 also includes a pair of integral end portions 5 and 6 that are slideably mounted in the ends of the through channel 7, respectively, and resilient intermediate portions 9a and 9b that connect the adjacent ends of the end portions 5 and 6 with the center portion 10, respectively. The intermediate portions 9a and 9b each have a serpentine configuration, as best shown in FIG. 4. The fastening member 3 contains weight-reducing recesses or voids 3'. The end portions 5 and 6 are provided with downwardly extending opposed locking foot portions 1 and 2 that project inwardly into the groove 40 contained in the bottom surface of the housing 3. The locking foot portions 1 and 2 have downwardly inclined catch surfaces 1a and 2b that are adapted to extend in locking engagement beneath the outwardly directed flange portions 4c and 4d of the support rail 4, respectively. Also, the adjacent ends of the foot portions 1 and 2 have downwardly outwardly inclined surfaces 14 and 15 that assist in mounting of the terminal block housing 8 on the rail 4, as will be described below. The foot portions 1 and 2 are received in corresponding recesses 21 and 22 that are formed in the opposed walls of the groove 40. The remote outer surfaces 16 and 17 of the foot portions are inclined to define stop surfaces that correspond with inclined stop surfaces 18 and 19 on the bottom walls of the housing recesses, thereby to limit the outward extent of travel of the end portions 5 and 6 of the fastening member 3. At their remote ends, the end portions 5 and 6 are provided with upwardly extending operating shoulders 42 and 43 that are arranged for engagement with the tip of a screwdriver 44, thereby to displace a selected one of the end portions outwardly relative to the center portion 10, as shown in FIG. 1–3. The center portion 10 has upwardly and downwardly extending stud portions 10a and 10b that connect the center portion 10 with the terminal block housing 8.

Figure 5:
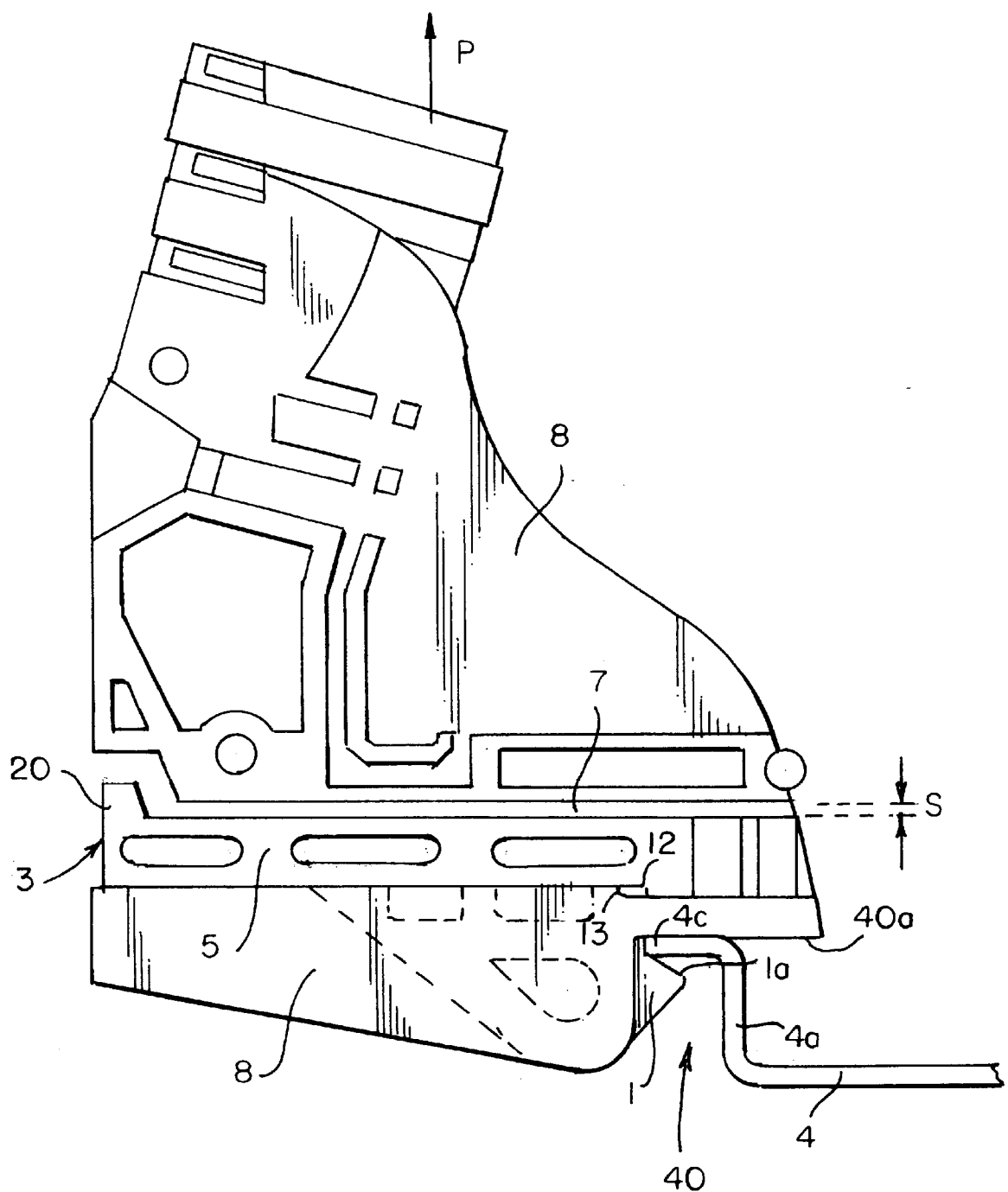
FIG. 5 is detailed front elevational view of the left hand locking foot in the engaged position relative to the terminal block housing and the support rail.

Referring now to FIGS. 3 and 5, it will be noted that the width of the end portion 5 is less than the corresponding dimension of the through passage 7, thereby to define a spacing distance S. In accordance with an important feature of the invention, cooperating stop means 12, 13 and 12', 13' on the adjacent surfaces of the end portions 5 and 6 and the bottom wall of the through passage 7, respectively, serve to lock the locking feet in their illustrated engaged positions. More particularly, as shown in FIG. 5, after the terminal block housing 8 is mounted on a support rail 4 and the catch surface 1a of the projecting hook portion 1 extends beneath the associated rail flange portion 4c, the housing 8 is displaced slightly upwardly as shown by the arrow P, thereby to effect engagement between the stop surface 12 on the bottom of the fastener end portion 5 and the upwardly extending stop 13 on the bottom wall of the through passage 7, thereby to lock the end portion 5 and the foot I in the illustrated engaged position. In the event that it is desired to disengage the cooperating stop surfaces 12 and 13, the end extremity of the end portion 5 is lifted slightly by the tip of the screwdriver to effect disengagement of the stop surface 12 from the housing stop surface 13, thereby to permit the end portion 5 to be displaced to the left by the tip of the screwdriver in engagement with shoulder 20, and into engagement with the inclined stop surface 18, whereupon the end of the terminal block may be lifted from the rail leg portion 4a for removal of the terminal block housing from the support rail 4.

As is known in the art, the terminal block housing 8 may support printed circuit means, electronic components, modules, or the like.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. A terminal block assembly adapted for connection with a horizontal support rail (4) having a generally U-shaped cross-sectional configuration including a horizontal base portion having a pair of opposed ends, a pair of vertical leg portions (4a, 4b) extending upwardly from said base portion ends, respectively, said leg portions having upper ends, and a pair of generally horizontal flange portions (4c, 4d) extending outwardly in opposite directions from said leg portion upper ends, respectively, said flange portions having upper surfaces, respectively, comprising:

(a) a generally rectangular vertically arranged terminal block housing (8) having top, bottom and end portions,
(1) said housing bottom portion having a bottom wall surface containing a transverse groove (40) adapted to receive the rail when said terminal block housing is mounted transversely upon the rail, said groove having an upper horizontal wall (40*a*) adapted to be seated upon the rail flange upper surfaces;

(2) said housing bottom portion containing a horizontal through passage (7) extending between said housing end portions adjacent and spaced vertically above said groove upper wall; and (b) means for fastening said terminal block housing to the rail, including a horizontal integral fastening member (3) mounted in said through passage, said fastening member comprising:

(1) a center portion (10);

(2) means (10*a*, 10*b*) connecting said center portion with said terminal block housing;

(3) a pair of fastening member end portions (5, 6) slidably arranged on opposite sides of, and spaced from, said center portion, respectively, said fastening member end portions having adjacent ends including downwardly extending hook-shaped foot portions (1, 2) that extend within said groove, respectively; and (4) a pair of integral spring portions (9*a*, 9*b*) connecting said fastening member end portions for independent displacement relative to said center portion, respectively, said spring portions normally biasing said fastening member end portions from outwardly separated disengaged positions in which said locking foot portions are disengaged from said support rail inwardly toward locking positions in which said locking foot portions extend beneath the rail flanges, respectively, thereby to fasten said terminal block housing to the support rail.

2. The terminal block assembly as defined in claim 1, wherein each of said integral spring portions has a serpentine configuration.

3. The terminal block assembly as defined in claim 1, wherein said through passage has a given vertical dimension, and further wherein each of said fastening member end portions has a corresponding vertical dimension that is less than said given vertical dimension, thereby to define a spacing distance (S) affording limited vertical displacement of said fastening member relative to said terminal block housing.

4. The terminal block assembly as defined in claim 3, wherein said fastener member end portions have bottom surfaces, and wherein said through passage has a bottom wall; and further wherein the bottom surfaces of said fastening member end portions and the bottom wall of said through passage include cooperating pairs of stop surfaces (12, 13; 12', 13') that are arranged to limit the extent of outward displacement of said fastener member end portions from their engaged positions relative to said center portion, respectively, the height of said stop surfaces being less than one-half of said spacing distance.

5. The terminal block assembly as defined in claim 4, wherein said foot portions have inwardly-directed downwardly-inclined upper catch surfaces (1*a*, 2*a*), respectively, that cooperate with said rail flange portions to displace said fastening member end portions downwardly in said through passage toward the mounting rail.

6. The terminal block assembly as defined in claim 1, wherein said housing groove has a pair of opposed side walls containing recesses (21,22) receiving said foot portions, respectively, said recesses including a pair of downwardly and inwardly inclined stop surfaces (18,19); and further wherein said foot portions include at their remote ends a pair of downwardly and inwardly inclined limiting surfaces (16,17), respectively, said limiting surfaces being arranged for engagement with said housing recess stop surfaces (18,19) to limit the outward extent of travel of said fastening member end portions, respectively.

7. The terminal block assembly as defined in claim 1, wherein each of said fastening member end portions includes remote ends having upwardly extending operating shoulders (42,43) arranged for engagement by a tool (44), whereby a given one of said fastening member end portions may be displaced independently by the tool outwardly toward said disengaged position relative to said center portion.

\* \* \* \* \*

UNITED STATES PATENT AND TRADEMARK OFFICE
CERTIFICATE OF CORRECTION

PATENT NO.    : 6,224,429 B1  
DATED         : May 1, 2001  
INVENTOR(S)   : Peter Bernhards et al.

It is certified that error appears in the above-identified patent and that said Letters Patent is hereby corrected as shown below:

<u>Title page,</u>  
Item [73], Assignee should be included as:

-- Assignee: Weidmüller Interface GmbH & Co. --

Signed and Sealed this

Tenth Day of September, 2002

Attest:

Attesting Officer

JAMES E. ROGAN  
*Director of the United States Patent and Trademark Office*